(12) United States Patent
Kim et al.

(10) Patent No.: US 11,365,323 B2
(45) Date of Patent: Jun. 21, 2022

(54) NEAR-INFRARED ABSORBING COMPOSITION, OPTICAL STRUCTURE, AND CAMERA MODULE AND ELECTRONIC DEVICE COMPRISING THE SAME

(71) Applicant: Samsung Electronics Co., Ltd., Suwon-si (KR)

(72) Inventors: Hyung Jun Kim, Suwon-si (KR); Yong Joo Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 168 days.

(21) Appl. No.: 16/746,159

(22) Filed: Jan. 17, 2020

(65) Prior Publication Data

US 2020/0291248 A1 Sep. 17, 2020

(30) Foreign Application Priority Data

Mar. 14, 2019 (KR) .................. 10-2019-0029471

(51) Int. Cl.
| | | |
|---|---|---|
| *C09D 5/32* | (2006.01) | |
| *C09D 7/63* | (2018.01) | |
| *C09D 7/61* | (2018.01) | |
| *H04N 5/357* | (2011.01) | |
| *C09D 4/00* | (2006.01) | |
| *G02B 5/20* | (2006.01) | |
| *C09D 7/40* | (2018.01) | |
| *C08K 3/22* | (2006.01) | |

(52) U.S. Cl.
CPC .............. *C09D 5/32* (2013.01); *C09D 4/00* (2013.01); *C09D 7/61* (2018.01); *C09D 7/63* (2018.01); *C09D 7/67* (2018.01); *G02B 5/208* (2013.01); *H04N 5/3572* (2013.01); *C08K 3/22* (2013.01)

(58) Field of Classification Search
None
See application file for complete search history.

(56) References Cited

U.S. PATENT DOCUMENTS

| 9,698,186 B2 | 7/2017 | Kawashima et al. |
| 10,036,838 B2 | 7/2018 | Bak et al. |
| 2015/0346404 A1* | 12/2015 | Bak .................. G02B 5/22 348/342 |
| 2018/0188428 A1 | 7/2018 | Arimura et al. |

FOREIGN PATENT DOCUMENTS

| JP | 07100996 A | 4/1995 |
| JP | 2002156521 A | 5/2002 |
| JP | 2014-197170 A | 10/2014 |
| JP | 6230479 B2 | 11/2017 |
| JP | 2018084647 A | 5/2018 |
| KR | 20150097618 A | 8/2015 |
| WO | WO-17056803 A1 | 4/2017 |

\* cited by examiner

*Primary Examiner* — Robert T Butcher
(74) *Attorney, Agent, or Firm* — Harness, Dickey & Pierce, P.L.C.

(57) ABSTRACT

Disclosed are a near-infrared absorbing composition, an optical structure, and a camera module and an electronic device including the same. The near-infrared absorbing composition includes a copper complex, a metal oxide particle, an amine-based compound represented by Chemical Formula 1, and a polymerizable compound having 2 to 4 functional polymerizable groups.

$N(R_1)(R_2)(R_3)$     [Chemical Formula 1]

Definitions of Chemical Formula 1 are the same as described in the detailed description.

19 Claims, 6 Drawing Sheets

NEAR-INFRARED ABSORBING COMPOSITION, OPTICAL STRUCTURE, AND CAMERA MODULE AND ELECTRONIC DEVICE COMPRISING THE SAME

CROSS-REFERENCE TO RELATED APPLICATION

This application claims priority to and the benefit of Korean Patent Application No. 10-2019-0029471, filed in the Korean Intellectual Property Office on Mar. 14, 2019, the entire contents of which are incorporated herein by reference.

BACKGROUND

1. Field

A near-infrared absorbing composition, an optical structure, and a camera module and an electronic device including the same are disclosed.

2. Description of Related Art

Recently, an electronic device including an image sensor that stores an image as an electrical signal, such as a cell phone, a digital camera, a camcorder, and a camera, has been widely used.

This electronic device may include an optical filter having a near-infrared absorptivity in order to reduce or prevent generation of an optical distortion by light in the other regions than a visible region.

The optical filter is generally mounted in front of an image sensor of a camera module and thus plays a role of effectively absorbing an incident near-infrared light and resolving the optical distortion phenomenon.

Recently, many attempts to make the optical filter into a thin film have been made according to a requirement of down-sizing and highly integrating an electronic device. However, when the thin-film optical filter is used to observe and take a picture of a high luminance subject, it may cause a flare phenomenon such as a wifi-type flare phenomenon that an outline is generated around the subject, a petal flare phenomenon that light is irradiated with the subject as the center, and the like.

This flare phenomenon is an optical distortion phenomenon generated when an image sensor in an electronic device recognizes light in a visible wavelength region and infrared to near-infrared wavelength regions together.

Accordingly, in order to reduce and/or minimize the optical distortion phenomenon, light in the near-infrared wavelength region not recognized by human eyes due to a luminosity difference of the human eyes and the image sensor needs to be absorbed or reflected and thus limited and/or blocked.

SUMMARY

A near-infrared absorbing composition having improved near-infrared absorbance and reliability in a high temperature/high humidity environment and low visible absorbance is provided.

In addition, an optical structure including a near-infrared absorption layer formed using the near-infrared absorbing composition and a camera module and an electronic device including the same are provided.

According to an embodiment, a near-infrared absorbing composition includes a copper complex; a metal oxide particle; an amine-based compound represented by Chemical Formula 1; and a polymerizable compound having 2 to 4 functional polymerizable groups.

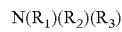  [Chemical Formula 1]

In Chemical Formula 1,
$R_1$, $R_2$, and $R_3$ are independently one of hydrogen, a C1 to C20 alkyl group, a C1 to C20 alkenyl group, a C1 to C20 alkynyl group, a C1 to C20 aryl group, a C1 to C20 heteroaryl group, and a functional group represented by Chemical Formula X,

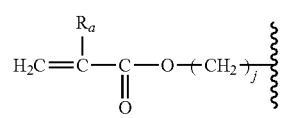  [Chemical Formula X]

In Chemical Formula X,
$R_a$ is one of hydrogen, a C1 to C20 alkyl group, a C1 to C20 heteroalkyl group, a C1 to C20 aryl group, and a C1 to C20 heteroaryl group, and
j is an integer ranging from 0 to 8.

In some embodiments, at least one of $R_1$ to $R_3$ may be the functional group represented by Chemical Formula X.

In some embodiments, the amine-based compound may be represented by Chemical Formula 1-1.

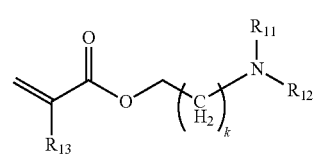  [Chemical Formula 1-1]

In Chemical Formula 1-1,
$R_{11}$, $R_{12}$, and $R_{13}$ may be independently one of hydrogen, a C1 to C20 alkyl group, a C1 to C20 alkenyl group, a C1 to C20 alkynyl group, a C1 to C20 aryl group, and a C1 to C20 heteroaryl group, and
k may be an integer ranging from 0 to 8.

In some embodiments, the polymerizable compound may be represented by Chemical Formula 2.

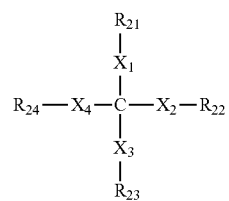  [Chemical Formula 2]

In Chemical Formula 2,
$X_1$, $X_2$, $X_3$, and $X_4$ may be independently a single bond, or a C1 to C20 alkylene group,
$R_{21}$, $R_{22}$, $R_{23}$, and $R_{24}$ are independently one of hydrogen, a C1 to C20 alkyl group, a C1 to C20 alkenyl group, a C1 to C20 alkynyl group, a C1 to C20 aryl group, a C1 to C20 heteroaryl group, $-OR_{b1}$, $-C(=O)R_{b2}$, $-OC(=O)R_{b3}$ (wherein $R_{b1}$, $R_{b2}$, and $R_{b3}$ are independently one of hydrogen, deuterium, a C1 to C20 alkyl group, a C1 to C20 alkenyl group, a C1 to C20 aryl group, and a C1 to C20 heteroaryl group), a C2 to C20 olefin group, a C3 to C30 (meth)acryl group, and a C2 to C20 epoxy group, and at least two of $R_{21}$, $R_{22}$, $R_{23}$, and $R_{24}$ are one of a C2 to C20 olefin group, a C3 to C30 (meth)acryl group, and a C2 to C20 epoxy group.

In some embodiments, the amine-based compound may be included in an amount of about 1 wt % to 20 wt % and the polymerizable compound may be included in an amount of about 1 wt % to about 30 wt %, each based on a total weight of the near-infrared absorbing composition.

In some embodiments, the metal oxide particle may include at least one alkali metal, at least one alkaline-earth metal, or both at least one alkali metal and at least one alkaline-earth metal. The metal oxide particle may further include at least one transition metal.

In some embodiments, the metal oxide particle may have a maximum absorption wavelength in a wavelength region of about 1000 nm to about 1500 nm.

In some embodiments, the copper complex may have a maximum absorption wavelength in a wavelength region of about 700 nm to about 950 nm.

In some embodiments, the near-infrared absorbing composition may further include a solvent. The solvent may include tetrahydrofuran, ethanol, butanol, acetone, methylethylketone, 1-methoxy-2-propanol, cyclopentanone, or a combination thereof.

According to another embodiment, an optical structure includes a first near-infrared absorption layer formed using the near-infrared absorbing composition. The first near-infrared absorption layer includes the metal oxide particle; and a cross-linking polymerization product of the copper complex, the amine-based compound, and the polymerizable compound.

In some embodiments, the first near-infrared absorption layer may exhibit a haze of less than or equal to about 10% in a wavelength region of about 430 nm to about 565 nm.

In some embodiments, the optical structure may further include a transparent substrate configured to contact the first near-infrared absorption layer.

In some embodiments, the optical structure may further include an organic dye.

In some embodiments, the optical structure may further include a second near-infrared absorption layer that is distinct from the first near-infrared absorption layer.

The organic dye may be included in at least one of the first near-infrared absorption layer and the second near-infrared absorption layer.

In some embodiments, the first near-infrared absorption layer and the second near-infrared absorption layer may be opposed to each other. The transparent substrate may be between the first near-infrared absorption layer and the second near-infrared absorption layer.

In some embodiments, the optical structure after being placed at a temperature of 80° C. and relative humidity 85 RH % for 120 hours may exhibit a change of an average light transmittance of less than or equal to about 4% in a wavelength region of about 430 nm to about 565 nm.

In some embodiments, the optical structure after being placed at a temperature of 80° C. and relative humidity 85 RH % for 120 hours may exhibit a change of an average light transmittance of less than or equal to about 10% in a wavelength region of about 700 nm to about 1200 nm.

In some embodiments, the optical structure may further include an infrared reflection layer on at least one of a surface of the first near-infrared absorption layer and a surface of the second near-infrared absorption layer.

On the other hand, according to another embodiment, a camera module may include a lens; an image sensor; and the aforementioned optical structure between the lens and the image sensor and/or an electronic device including the aforementioned optical structure are provided.

The near-infrared absorbing composition may have improved near-infrared absorbance and reliability in a high temperature/high humidity environment and exhibit low visible absorbance.

In addition, the optical structure formed using the near-infrared absorbing composition may exhibit improved near-infrared absorbance and reliability in a high temperature/high humidity environment and low visible absorbance, and also may minimize curl occurrence even if it becomes thick.

In addition, a camera module and an electronic device including the optical structure is provided.

DETAILED DESCRIPTION

Figure 1:
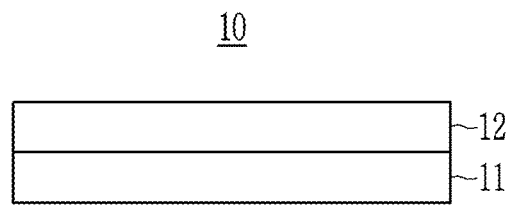
FIG. 1 is a schematic cross-sectional view showing an optical structure according to an embodiment.

Hereinafter, example embodiments will be described in detail so that a person skilled in the art would understand the same. This disclosure may, however, be embodied in many different forms and is not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, for a particle diameter of a particle in the present disclosure, although it may be numerized by a measurement to show an average size of a group, the generally used method includes a mode diameter showing the maximum value of the distribution, a median diameter corresponding to the center value of integral distribution curve, a variety of average diameters (numeral average, length average, area average, mass average, volume average, etc.), and the like. Unless particularly mentioning otherwise, an average particle diameter means a numeral average diameter in the present disclosure, and it is obtained by measuring D50 (particle diameter at a position of distribution rate of 50%).

In an embodiment, unless otherwise described in an embodiment, a thickness of each constituent element may refer to "an average thickness."

The "average thickness" of each constituent element is calculated by extracting arbitrary 5 to 10 points from a scanning electron microscopic (SEM) cross-sectional image of each constituent element, measuring thicknesses, and calculating an arithmetic average of the measured thicknesses.

Expressions such as "at least one of," when preceding a list of elements (e.g., A, B, and C), modify the entire list of elements and do not modify the individual elements of the list. For example, "at least one of A, B, and C," "at least one of A, B, or C," "one of A, B, C, or a combination thereof," and "one of A, B, C, and a combination thereof," respectively, may be construed as covering any one of the following combinations: A; B; C; A and B; A and C; B and C; and A, B, and C."

Hereinafter, a near-infrared absorbing composition according to an embodiment is described.

A near-infrared absorbing composition according to an embodiment may include a copper complex, metal oxide particles, an amine-based compound, and a polymerizable compound having 2 to 4 functional polymerizable groups.

The copper complex and the metal oxide particles may absorb light in a near-infrared wavelength region, respectively. Accordingly, the near-infrared absorbing composition according to an embodiment may exhibit absorption for near-infrared light belonging to for example a wavelength region of about 700 nm to about 1200 nm.

In an embodiment, the amine-based compound may be represented by Chemical Formula 1.

$$N(R_1)(R_2)(R_3) \qquad \text{[Chemical Formula 1]}$$

In Chemical Formula 1, $R_1$, $R_2$, and $R_3$ are independently one of hydrogen, a C1 to C20 alkyl group, a C1 to C20 alkenyl group, a C1 to C20 alkynyl group, a C1 to C20 aryl group, a C1 to C20 heteroaryl group, and a functional group represented by Chemical Formula X,

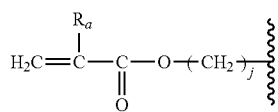

[Chemical Formula X]

In Chemical Formula X, $R_a$ is one of hydrogen, a C1 to C20 alkyl group, a C1 to C20 heteroalkyl group, a C1 to C20 aryl group, and a C1 to C20 heteroaryl group, and j is an integer ranging from 0 to 8.

In Chemical Formula 1, at least one of $R_1$ to $R_3$ may be the functional group represented by Chemical Formula X. In this case, the amine-based compound according to an embodiment may act as a type of binder when forming a near-infrared absorption layer using the near-infrared absorbing composition.

For example, one of $R_1$ to $R_3$ may be the functional group represented by Chemical Formula X. Specifically, the amine-based compound may be represented by Chemical Formula 1-1.

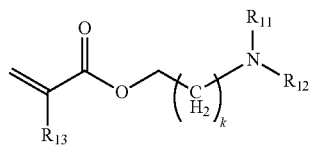

[Chemical Formula 1-1]

In Chemical Formula 1-1, $R_{11}$, $R_{12}$, and $R_{13}$ are independently one of hydrogen, a C1 to C20 alkyl group, a C1 to C20 alkenyl group, a C1 to C20 alkynyl group, a C1 to C20 aryl group, and a C1 to C20 heteroaryl group, and k is an integer ranging from 0 to 8.

For example, at least one of $R_{11}$ and $R_{12}$ may be hydrogen and the other may be a C1 to C20 alkyl group, a C1 to C20 alkenyl group, a C1 to C20 alkynyl group, a C1 to C20 aryl group, or a C1 to C20 heteroaryl group.

For example, at least one of $R_{11}$ and $R_{12}$ may be hydrogen and the other may be a C1 to C20 alkyl group, a C1 to C20 aryl group, or a C1 to C20 heteroaryl group.

$R_{11}$ and $R_{12}$ may independently be a C1 to C20 alkyl group, a C1 to C20 alkenyl group, a C1 to C20 alkynyl group, a C1 to C20 aryl group, or a C1 to C20 heteroaryl group.

On the other hand, for example $R_{13}$ may be hydrogen, a C1 to C20 alkyl group, a C1 to C20 alkenyl group, or a C1 to C20 alkynyl group. For example, $R_{13}$ may be hydrogen or a C1 to C20 alkyl group.

However, the amine-based compound according to an embodiment is not necessarily limited to the above descriptions, and may be variously changed depending on types and amounts of the copper complex and/or the metal oxide particles and/or polymerizable compound included therein.

The aforementioned amine-based compound in the near-infrared absorbing composition according to an embodiment may be included in an amount of greater than or equal to about 1 wt %, for example greater than or equal to about 2 wt %, greater than or equal to about 3 wt %, greater than or equal to about 4 wt %, or greater than or equal to about 5 wt %, and for example 20 wt %, less than or equal to about 19 wt %, less than or equal to about 18 wt %, less than or equal to about 17 wt %, less than or equal to about 16 wt %, or less than or equal to about 15 wt %, for example about 1 wt % to about 20 wt % or about 5 wt % to about 15 wt % based on a total weight of the near-infrared absorbing composition.

When the amount of the amine-based compound according to an embodiment is less than about 1 wt %, the metal oxide particles may be inadvertently coordinated to the copper complex and as a result, aggregation of the copper complex and the metal oxide particles may occur when the near-infrared absorbing composition is used to form a film.

On the other hand, when the amount of the amine-based compound is greater than about 20 wt %, it may be difficult to form a film using the near-infrared absorbing composition due to lack of cross-linking between the amine-based compounds and/or the polymerizable compound therewith.

Meanwhile, in an embodiment, the polymerizable group included in the polymerizable compound means a group involved in a polymerization reaction. In an embodiment, the polymerizable compound may act as a binder along with the aforementioned amine-based compound during the formation of near-infrared absorption layer using the near-infrared absorbing composition.

The polymerizable group is not particularly limited so long as it does not inhibit inherent near-infrared absorptivity of the near-infrared absorbing composition, but may be for example a C2 to C20 olefin group, a C3 to C30 (meth)acryl group, or a C2 to C20 epoxy group.

In an embodiment, the polymerizable compound may be a monomer, an oligomer, a polymer, or a combination thereof. For example, the polymerizable compound may be represented by Chemical Formula 2.

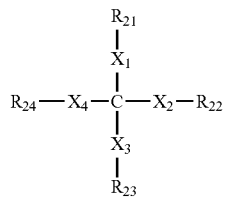

[Chemical Formula 2]

In Chemical Formula 2, $X_1$, $X_2$, $X_3$, and $X_4$ are independently a single bond, or a C1 to C20 alkylene group, $R_{21}$, $R_{22}$, $R_{23}$, and $R_{24}$ are independently one of hydrogen, a C1 to C20 alkyl group, a C1 to C20 alkenyl group, a C1 to C20 alkynyl group, a C1 to C20 aryl group, a C1 to C20 heteroaryl group, —$OR_{b1}$, —$C(=O)R_{b2}$, —$OC(=O)R_{b3}$ (wherein $R_{b1}$, $R_{b2}$, and $R_{b3}$ are independently one of hydrogen, deuterium, a C1 to C20 alkyl group, a C1 to C20 alkenyl group, a C1 to C20 aryl group, and a C1 to C20 heteroaryl group), a C2 to C20 olefin group, a C3 to C30 (meth)acryl group, and a C2 to C20 epoxy group, and at least two of $R_{21}$, $R_{22}$, $R_{23}$, and $R_{24}$ are one of a C2 to C20 olefin group, a C3 to C30 (meth)acryl group, and a C2 to C20 epoxy group.

$X_1$, $X_2$, $X_3$, and $X_4$ may be a linking group connecting carbon located at the center of Chemical Formula 2 with $R_{21}$, $R_{22}$, $R_{23}$, and $R_{24}$, and at least two of, for example, three or even four functional groups of $R_{21}$, $R_{22}$, $R_{23}$, and $R_{24}$ may be the aforementioned polymerizable group.

When the polymerizable group of the polymerizable compound satisfies the above ranges, it is easy to form near-infrared absorption layer using the near-infrared absorbing composition, and the formed near-infrared absorption layer is relatively soft and may have excellent reliability against an external impact or an environmental change.

On the other hand, when the functional group of the polymerizable group of the polymerizable compound is less than two, a film formation using the near-infrared absorbing composition may be difficult due to lack of cross-linking polymerization between the polymerizable compounds and/or the amine-based compound therewith. When it is greater than five, brittleness of the near-infrared absorption layer using the near-infrared absorbing composition becomes relatively strong, which may be vulnerable to an external impact or an environmental change.

The aforementioned polymerizable compound of the near-infrared absorbing composition according to an embodiment may be included in an amount of less than or equal to about 1 wt %, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, greater than or equal to about 8 wt %, greater than or equal to about 9 wt %, or greater than or equal to about 10 wt %, and for example less than or equal to about 30 wt %, less than or equal to about 29 wt %, less than or equal to about 28 wt %, less than or equal to about 27 wt %, less than or equal to about 26 wt %, less than or equal to about 25 wt %, less than or equal to about 24 wt %, less than or equal to about 23 wt %, less than or equal to about 22 wt %, less than or equal to about 21 wt %, or less than or equal to about 20 wt %, for example about 1 wt % to about 30 wt %, or about 10 wt % to about 20 wt % based on a total weight of the near-infrared absorbing composition.

When the polymerizable compound according to an embodiment is less than about 1 wt %, a film formation using the near-infrared absorbing composition may be difficult due to lack of cross-linking polymerization between the polymerizable compounds and/or the amine-based compound therewith. When it is greater than about 30 wt %, the near-infrared absorbing composition may deteriorate near-infrared absorptivity of the film formed using the near-infrared absorbing composition because amounts of the metal oxide particles and the copper complex are relatively decreased.

On the other hand, the metal oxide particles according to an embodiment may exhibit the above-described near-infrared absorptivity and may exhibit absorptivity for a wavelength region of about 800 nm to about 2000 nm.

For example, metal oxide particles may include at least one first metal of an alkali metal and an alkaline-earth metal and at least one second metal of transition metals.

Specifically, the first metal may include at least one of lithium, sodium, potassium, rubidium, cesium, beryllium, magnesium, calcium, strontium, barium, and radium, for example at least one of rubidium, cesium, strontium, and barium, for example cesium.

The second metal may include at least one of titanium, zirconium, hafnium, vanadium, niobium, tantalum, chromium, molybdenum, tungsten, manganese, iron, ruthenium, osmium, cobalt, rhodium, iridium, nickel, palladium, platinum, copper silver, gold, zinc, and cadmium, for example at least one of chromium, molybdenum, and tungsten, for example tungsten. When the second metal includes tungsten, the metal oxide particles may exhibit improved near-infrared absorptivity in the wavelength region of about 800 nm to about 1500 nm due to tungsten.

In an embodiment, the metal oxide particles may be cesium tungsten oxide. A mole ratio of cesium to tungsten in the metal oxide particles may be varied depending on target specific near-infrared wavelength regions, chemical stability of the metal oxide particles, and environments of the film formed using the near-infrared absorbing composition.

In an embodiment, sizes of the metal oxide particles are not particularly limited and may be varied in consideration of a film formation or a thin film formation of the near-infrared absorption layer formed using a near-infrared absorbing composition. For example, the sizes of the metal oxide particles may be greater than or equal to about 1 nm, greater than or equal to about 5 nm, or greater than or equal to about 10 nm, and for example less than or equal to about 800 nm, less than or equal to about 700 nm, less than or equal to about 600 nm, less than or equal to about 500 nm, less than or equal to about 400 nm, or less than or equal to about 300 nm, for example about 1 nm to about 800 nm or about 10 nm to about 300 nm.

The metal oxide particles according to an embodiment may vary depending on types and amounts of the copper complex included therewith, but may be for example designed to have a maximum absorption wavelength in a wavelength region of about 1000 nm to about 1500 nm. Through this, it may complement the near-infrared absorptivity with the copper complex described below.

In an embodiment, the copper complex may exhibit near-infrared absorptivity along with the aforementioned metal oxide particles and may exhibit absorptivity for a wavelength region of about 700 nm to about 1200 nm.

In an embodiment, the copper complex may be represented by Chemical Formula 3.

$$Cu(L)_{n1}(Z)_{n2}$$ [Chemical Formula 3]

In Chemical Formula 3, L is a ligand coordinated to copper,

Z is a halogen atom, $NO_3$, $ClO_4$, $SO_4$, CN, SCN, $BF_4$, $PF_6$, a phenyl boric acid compound, or a combination thereof, $n_1$ is an integer ranging from 1 to 4, and $n_2$ is an integer ranging from 0 to 4.

L is not particularly limited as long as it is capable of forming a coordination bond with the copper ion. However, L may be for example, an organic acid compound or a derivative thereof, an inorganic acid compound or a derivative thereof, an alcohol compound, a thiol compound, or a combination thereof.

Either one ligand may be present at the L position. However, the ligand is not limited thereto and two or more ligands may be present.

The copper complex according to an embodiment may vary according to types and amounts of the metal oxide particles included together, but for example may be designed so that it may have a maximum absorption wavelength in a wavelength region of about 700 nm to about 1200 nm, for example about 700 nm to about 1100 nm or about 700 nm to about 950 nm. Through this, it may complement the near-infrared absorptivity with the metal oxide particles.

The near-infrared absorbing composition according to an embodiment may further include a solvent. In an embodiment, the solvent may be an organic solvent. Examples of the organic solvent may be tetrahydrofuran, ethanol, butanol, acetone, methylethylketone, 1-methoxy-2-propanol, cyclopentanone, or a combination thereof. In other words, the copper complex according to an embodiment may exhibit excellent solubility in the organic solvent.

In an embodiment, the near-infrared absorbing composition may further include an additive for initiating cross-linking polymerization reactions of each of the aforementioned amine-based compound and/or polymerizable compound or mutual cross-linking polymerization reactions, for example a photoinitiator (when the amine-based compound and/or the polymerizable compound have photo-cross-linking properties). However, an embodiment is not necessarily limited thereto, but the amine-based compound and/or the polymerizable compound may have a thermal cross-linking property and the additive may be a surfactant, an anti-oxidizing agent, and the like.

On the other hand, in an embodiment, the near-infrared absorbing composition may further include an organic dye having near-infrared absorptivity along with the aforementioned copper complex and metal oxide particle. The organic dye included in the near-infrared absorbing composition dye is not particularly limited, but may be for example a polymethine compound, a phthalocyanine compound, a merocyanine compound, a naphthalocyanine compound, a triarylmethane compound, a dipyrromethene compound, an anthraquinone compound, a naphthoquinone compound, a diquinone compound, a rylene compound, a perylene compound, a squaraine compound, a croconium compound, a pyrylium compound, a thiopyrylium compound, a diketopyrrolopyrrole compound, an immonium compound, a diimmonium compound, a dithiolene metal complex compound, a derivative thereof, or a combination thereof. However, an embodiment is not necessarily limited thereto, and the near-infrared absorbing composition may be adjusted so as not to include a separate organic dye.

A general near-infrared absorbing material may be classified into an organic material and an inorganic material, and examples of the organic material may include organic dyes such as a immonium compound, a diimmonium compound, and the like and examples of the inorganic material may include for example a soluble metal complex such as copper-phosphate or metal oxide particles. This soluble metal complex in general has a structure that at least one homogeneous ligand is combined to a central metal (e.g., copper).

The organic material has excellent near-infrared absorbance, but as described above, the above near-infrared absorption wavelength has a narrow line width.

Accordingly, the organic material alone may hardly absorb light in a wide near-infrared wavelength region ranging from about 700 nm to about 1200 nm, and accordingly, various kinds of organic materials need to be stacked. Herein, since light transmittance of a near-infrared absorption layer using the organic material in a visible region may be deteriorated, there is a limit in increasing the stack number of the near-infrared absorption layer.

The inorganic material has lower near-infrared absorbance than the organic material and thus may be formed into a little thicker near-infrared absorption layer than that of the organic material in order to secure absorbance (e.g., about 50 μm to about 200 μm). The inorganic material has improved light transmittance about a visible region, and accordingly, even though the thickness is increased, a light loss due to visible light absorption thereof may be small.

However, when the near-infrared absorption layer is formed to be somewhat thick as described above, the thickened absorption layer may cause a curl of the film, which may cause quality deterioration of the optical structure.

In order to solve this problem, a method of forming a near-infrared absorption layer by mixing the aforementioned metal complex and the organic material together has been proposed. In this case, a material to serve as a binder for the metal complex is required to be included.

However, it is reported that when a near-infrared absorption layer is formed using a near-infrared absorbing composition including a metal complex, a binder, and an organic material, optical characteristics of the formed near-infrared absorption layer is greatly deteriorated in a high temperature/high humidity environment. This may be unintended properties deterioration of the near-infrared absorbing composition which may be caused by the mixing of the above binder and the organic material.

Accordingly, it is considered that a near-infrared absorbing composition and a near-infrared absorption layer are formed by mixing the metal complex and the metal oxide particles which belong to inorganic materials while excluding organic materials.

However, the metal oxide particles may be unintentionally coordinated on the metal complex to be aggregated, and the resulting near-infrared absorption layer exhibits large optical characteristic deviations of the aggregated and non-aggregated portions, as well as haze in a visible region.

On the other hand, the near-infrared absorbing composition according to an embodiment includes a copper complex and metal oxide particles together with an amine-based compound represented by Chemical Formula 1 above. The amine moiety included in the amine-based compound has a stronger coordination on the copper complex than the metal oxide particles and it is possible to prevent and/or minimize the coordination of the metal oxide particles at coordination sites of the copper complexes.

Thus, the near-infrared absorbing composition according to an embodiment, the same near-infrared absorption layer can exhibit excellent optical transmittance in a visible and visible region because the optical characteristic includes the amine-based compound. Thus, because the near-infrared absorbing composition according to an embodiment includes the amine-based compound, the near-infrared absorption layer using the same may exhibit uniform optical-characteristics and excellent optical transmittance in a visible region.

In addition, the amine-based compound further includes a reactive functional group, which may perform cross-linking functions in addition to a coordination-inhibiting function of the metal oxide particles on the copper complex.

On the other hand, the near-infrared absorbing composition according to an embodiment may include the polymerizable compound having 2 to 4 functional polymerizable groups. The polymerizable compound may complement the cross-linking function of the above amine-based compound and may provide a near-infrared absorption layer which exhibits excellent reliability for an external impact and an environmental change in high temperature/high humidity, by including an appropriate number of polymerizable groups.

That is, the near-infrared absorbing composition according to an embodiment includes the amine-based compound and the polymerizable compound together with the copper complex and the metal oxide particles, it may form a near-infrared absorption layer that exhibits excellent near-infrared absorbance, and low visible light absorbance even in an environmental change such as a high temperature/high humidity and an external impact.

Accordingly, a near-infrared absorption layer formed by using the near-infrared absorbing composition according to an embodiment may be easily formed to have a thickness of about 50 μm to about 200 μm. In addition, the formed near-infrared absorption layer may have improved near-infrared absorbance, low visible absorbance, and reliability in a high temperature/high humidity environment due to the aforementioned near-infrared absorbing composition.

Hereinafter, an optical structure according to an embodiment, that is, an optical structure including a near-infrared absorption layer manufactured using the composition is described with reference to drawings.

FIG. 1 is a schematic cross-sectional view showing am optical structure according to another embodiment.

Referring to FIG. 1, an optical structure 10 includes a first near-infrared absorption layer 12. In an embodiment, for convenience, as one example of the optical structure 10, the first near-infrared absorption layer 12 is formed on a transparent substrate 11, but the optical structure 10 according to an embodiment is not limited thereto.

For example, the optical structure according to an embodiment may be formed directly on an image sensor, not on a transparent substrate, or may be a film covered with a releasing paper or the like.

On the other hand, the first near-infrared absorption layer may be formed as a monolayer or a multilayer. In the case of the multiple layer, it may include an interlayer interfacial adhesive and an overcoating layer that limits and/or prevents oxygen and moisture permeation. In addition, the first near-infrared absorption layer and another layer performing near-infrared absorption and/or reflection may provide a multilayer.

In an embodiment, the transparent substrate 11 may be made of an optically transparent substrate and may have, for example an average light transmittance of greater than or equal to about 80%, greater than or equal to about 85%, or greater than or equal to about 90% in a visible region. Herein, the visible region may be for example a wavelength region of greater than about 380 nm and less than about 700 nm and the average light transmittance is an average value of light transmittance measured when incident light is radiated in a vertical direction (front direction) of the transparent substrate 11.

The transparent substrate 11 may be made of glass or a polymer material. In an embodiment, the transparent substrate 11 may be made of a polymer material. In an embodiment, when the transparent substrate 11 is made of a polymer material, it is advantageous to make the transparent substrate 11 and the optical structure 10 thin.

The polymer material may include for example polyethyleneterephthalate, polyethylenenaphthalate, triacetyl cellulose, polycarbonate, a cycloolefin polymer, poly(meth)acrylate, polyimide, polystyrene, or a combination thereof, but is not limited thereto.

The transparent substrate 11 may selectively absorb at least one part of light in an ultraviolet (UV) region. Ultraviolet (UV) absorption capability of the transparent substrate 11 may be caused by a material itself of the transparent substrate 11, but the transparent substrate 11 having ultraviolet (UV) absorption capability may be formed by adding an ultraviolet (UV) absorber thereto. Herein, the ultraviolet (UV) region may be, for example, a wavelength region of less than or equal to about 380 nm.

The transparent substrate 11 may absorb most of light in a wavelength region of at least about 350 nm to about 380 nm, and thus an average light transmittance of the optical structure 10 in a wavelength region of about 350 nm to about 380 nm may be less than or equal to about 1%, less than or equal to about 0.8%, or less than or equal to about 0.5%.

The transparent substrate 11 may include various additives according to desirable properties of the optical structure 10 as needed.

The transparent substrate 11 may have a thickness of about 10 μm to 120 μm, specifically about 10 μm to about 100 μm, for example about 10 μm to about 80 μm, about 60 μm to about 40 μm, or about 10 μm to 20 μm.

The transparent substrate 11 may be formed as a multilayer of at least two layers if needed, or omitted, as described above.

The first near-infrared absorption layer 12 is configured to transmit light in a visible region and to selectively absorb at least one part of light in a near-infrared region. Herein, the visible region may be for example a wavelength region of greater than about 380 nm and less than about 700 nm and the near-infrared region may be for example a wavelength region of about 700 nm to about 1200 nm.

The first near-infrared absorption layer 12 includes the aforementioned metal oxide particles and a cross-linking polymerization product obtained by a cross-linking polymerization of the aforementioned copper complex, amine-based compound, and polymerizable compound by heat or light and may further include other surfactants, anti-oxidizing agents, photoinitiators, and/or the aforementioned organic dye.

In an embodiment, each of the copper complex, the amine-based compound, and the polymerizable compound have the polymerizable group, and thus they may perform a cross-linking polymerization between adjacent different types of constituent elements (e.g., the amine-based compound and/or the polymerizable compound with reference to the copper complex) and/or the same types of constituent elements (e.g., between copper complexes). In an embodiment, the types of the cross-linking polymerization of the cross-linking polymerization product may be for example a cross-linking polymerization between copper complexes, a cross-linking polymerization between amine-based compounds, a cross-linking polymerization between polymerizable compounds, a cross-linking polymerization between the copper complex and the amine-based compound, a cross-linking polymerization between the copper complex and the polymerizable compound, a cross-linking polymerization between the amine-based compound and the polymerizable compound, or a combination thereof.

In an embodiment, the aforementioned copper complex and metal oxide particles in the first near-infrared absorption layer 12 may be included in each appropriate amount so that the first near-infrared absorption layer 12 may have a desirable near-infrared absorption capability. In an embodiment, the copper complex may be for example included in an amount of greater than or equal to about 1 wt %, for example greater than or equal to about 10 wt %, greater than or equal to about 20 wt %, greater than or equal to about 30 wt %, or greater than or equal to about 40 wt % and for example less than or equal to about 90 wt %, less than or equal to about 85 wt %, or less than or equal to about 80 wt %, for example about 1 wt % to about 90 wt % or about 40 wt % to about 80 wt % based on the total weight of the first near-infrared absorption layer 12.

The metal oxide particles may be for example included in an amount of greater than or equal to about 0.001 wt %, greater than or equal to about 0.005 wt %, or greater than or equal to about 0.01 wt %, and for example less than or equal to about 0.1 wt %, less than or equal to about 0.09 wt %, or less than or equal to about 0.08 wt %, for example about 0.001 wt % to about 0.1 wt %, for example about 0.01 wt % to about 0.08 wt % based on the total weight of the first near-infrared absorption layer 12.

The first near-infrared absorption layer 12 may be formed by the near-infrared absorbing composition on the transparent substrate 11 and then polymerizing the aforementioned amine-based compound and/or polymerizable compound. In other words, the first near-infrared absorption layer 12 may be formed through a polymerization reaction of the amine-based compound and/or polymerizable compounds in the near-infrared absorbing composition.

The composition coated on the transparent substrate 11 may be selectively curable by heat and/or light and the coating may be for example a spin coating, a slit coating, a bar coating, a blade coating, a slot die coating, and/or an inkjet coating.

The first near-infrared absorption layer 12 of the optical structure 10 may have, for example a thickness of about 10 µm to about 200 µm, for example about 50 µm to about 200 µm, or about 50 µm to about 150 µm. Within the thickness ranges, the optical structure 10 may realize performance of an optical filter.

However, an embodiment is necessarily limited thereto, a thickness of the first near-infrared absorption layer 12 may be variously set with a consideration to the types of the copper complexes and/or metal oxide particles, the types of amine-based compound, the types of the polymerizable group included in the polymerizable compound, and other constituent elements that constitute the optical structure, for example constituent elements such as the transparent substrate, a second near-infrared absorption layer and/or an infrared reflection layer which will be described later in the first near-infrared absorption layer 12 and their relationships with other constituent elements consisting of the near-infrared absorbing film, for example, a transparent substrate, a second near-infrared absorption layer and/or infrared reflection layer which will be described later, and the like.

The optical structure 10 according to the present embodiment transmits light in a visible region effectively and blocks light in a near-infrared region effectively, even if the transparent substrate 11 and the first near-infrared absorption layer 12 are sequentially stacked.

In addition, light in an ultraviolet (UV) region may be effectively blocked by imparting an absorption function of light in an ultraviolet (UV) region to the transparent substrate 11. Accordingly, the optical structure 10 may effectively sense light in a visible region in a sensor sensing light such as an image sensor by increasing purity of transmittance of light in a visible region of light in all wavelength regions and thus optical distortion by light besides the visible region may be decreased or prevented.

For example, the optical structure 10 including the first near-infrared absorption layer 12 may have an average light transmittance of greater than or equal to 70%, greater than or equal to about 75%, greater than or equal to about 80%, greater than or equal to about 81%, greater than or equal to about 82%, or greater than or equal to about 83% in a wavelength region of about 435 nm to about 565 nm, an average light transmittance of less than or equal to about 20%, or less than or equal to about 18% in a wavelength region of about 700 nm to about 950 nm, and an average light transmittance of less than or equal to about 30%, less than or equal to about 29%, or less than or equal to about 28% in a wavelength region of about 700 nm to about 1100 nm. Herein, the average light transmittance is an average value of light transmittance measured when incident light is radiated in a vertical direction (front direction) of the optical structure 10.

For example, the optical structure 10 including the first near-infrared absorption layer 12 may have a haze of less than or equal to about 10%, less than or equal to about 9%, less than or equal to about 8%, less than or equal to about 7%, less than or equal to about 6%, less than or equal to about 5%, less than or equal to about 4%, less than or equal to about 3%, less than or equal to about 2%, or less than or equal to about 1% in a wavelength region of about 430 nm to about 565 nm.

In this way, the optical structure 10 may selectively absorb and thus block light in a near-infrared wavelength region corresponding to a boundary between a visible region and an infrared region out of all the wavelength region and thus reduces or prevents crossing and mingling of a signal by light in a visible region with a signal by light in a nonvisible region and resultantly, may reduce or prevent an optical distortion such as a crosstalk.

In addition, the optical structure 10 may effectively absorb light in a near-infrared region regardless of an incident direction and accordingly, effectively absorb and block incident light in a near-infrared region from a side direction and thus reduce or prevent the incident light in a near-infrared region from a side direction from distorting the signal by light in a visible region.

In addition, the optical structure 10 may exhibit excellent near-infrared absorbance, low visible absorbance, and low haze for a visible light due to the aforementioned near-infrared absorbing composition. In addition, because the optical structure 10 includes a cross-linking polymerization product obtained by a cross-linking polymerization of the copper complex, the amine-based compound, and the polymerizable compound by heat or light as described above, the first near-infrared absorption layer 12 may have improved reliability in an environment of high temperature/high humidity.

Figure 2:
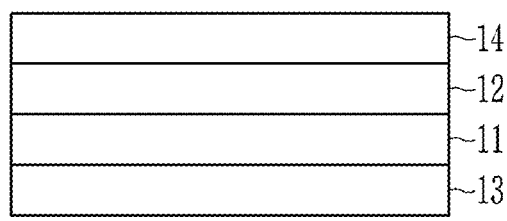
FIG. 2 is a schematic cross-sectional view showing an optical structure according to an example variation.

FIG. 2 is a schematic cross-sectional view showing an optical structure according to one example variation.

Referring to FIG. 2, the optical structure 10 according to one example variation includes a transparent substrate 11, a first near-infrared absorption layer 12, and infrared reflection layers 13 and 14.

The transparent substrate 11 and the first near-infrared absorption layer 12 are the same as described above.

The infrared reflection layers 13 and 14 may be disposed on at least one of one surface of the transparent substrate and one surface of the near-infrared absorption layer. For example, the infrared reflection layers 13 and 14 may be disposed under the transparent substrate 11 and/or on the first near-infrared absorption layer 12. In the drawing, the infrared reflection layers 13 and 14 are shown, but either of them may be omitted.

The infrared reflection layers 13 and 14 effectively reflect light in an infrared wavelength region and thus may effectively reduce or prevent optical distortion by the light in an infrared wavelength region.

The infrared reflection layers 13 and 14 may reflect light in a part of a near-infrared region, a mid-infrared region, and a far-infrared region, for example a wavelength region of about 700 nm to about 3 µm.

The infrared reflection layers 13 and 14 are not particularly limited as long as they reflect light in an infrared wavelength region and may be, for example a high refractive-index reflective layer, a reflective layer including a high refractive-index nanoparticle, or a multilayer including a plurality of layers having different refractive indexes, but is not limited thereto.

For example, the infrared reflection layers 13 and 14 may include a first layer and a second layer consisting materials having different refractive indexes, and may include a multilayer where the first layer and the second layer are alternately and repeatedly stacked.

The first layer and the second layer may be, for example a dielectric layer including an oxide layer, a nitride layer, an oxynitride layer, a sulfide layer, or a combination thereof, and for example the first layer may have a refractive index of less than about 1.7 and the second layer may have a refractive index of greater than or equal to about 1.7. Within the ranges, for example the first layer may have a refractive index of greater than or equal to about 1.1 and less than about 1.7 and the second layer may have a refractive index about 1.7 to about 2.7, or for example the first layer may have a refractive index of about 1.2 to about 1.6 and the second layer may have a refractive index of about 1.8 to about 2.5.

The first layer and the second layer may include any material having the refractive indexes within the ranges, and for example the first layer may include a silicon oxide, an aluminum oxide, or a combination thereof and the second layer may include titanium oxide, zinc oxide, indium oxide, zirconium oxide, or a combination thereof. The first layer and the second layer may be, for example five-layered to 80-layered, for example 5-layered to 50-layered.

Thicknesses of the first layer and the second layer may be determined according to a refractive index and a reflection wavelength of each layer, for example each of the first layer may have a thickness of about 10 nm to about 700 nm and each of the second layer may have a thickness of about 30 nm to about 600 nm. Thicknesses of the first layer and the second layer may be the same or different.

The optical structure 10 may have, for example a thickness of about 10 µm to about 200 µm. Within the ranges of the thickness, an infrared absorption optical filter may be realized.

The optical structure 10 according to the present embodiment includes the transparent substrate 11 and the first near-infrared absorption layer 12 like the above embodiment and transmits light in a visible region effectively and blocks light in a near-infrared region effectively. In addition, the optical structure 10 according to the embodiment further includes infrared reflection layers 13 and 14, thereby effectively blocks light in a mid-infrared region and a far-infrared region by reflecting them, and thus may be effectively used as an optical filter preventing transmittance of light in all the infrared regions. Accordingly, the optical structure 10 may be applied to an electronic device and thus may reduce or prevent distortion of an optical signal in a visible region by light in the infrared region.

The optical structure 10 according to the present embodiment includes the transparent substrate 11 and the first near-infrared absorption layer 12 like the above embodiment and transmits light in a visible region effectively and blocks light in a near-infrared region effectively. In addition, the optical structure 10 according to the present embodiment further includes the infrared reflection layers 13 and 14, thereby effectively blocks light in a mid-infrared region and a far-infrared region by reflecting them, and thus may be effectively used as an optical filter preventing transmittance of light in all the infrared regions. Accordingly, the optical structure 10 may be applied to an electronic device and thus may reduce or prevent distortion of an optical signal in a visible region by light in the infrared region.

Figure 3:
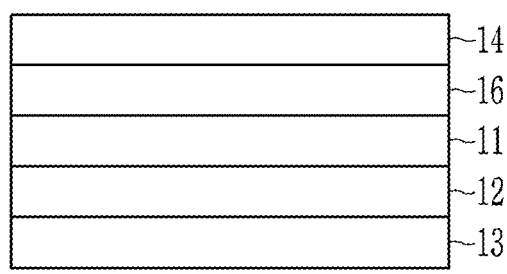
FIG. 3 is a schematic cross-sectional view showing an optical structure according to another example variation.

FIG. 3 is a schematic cross-sectional view showing an optical structure according to another example variation.

Referring to FIG. 3, an optical structure 10 according to another example variation includes a transparent substrate 11, a first near-infrared absorption layer 12, a second near-infrared absorption layer 16, and infrared reflection layers 13 and 14.

The transparent substrate 11, the first near-infrared absorption layer 12, and the infrared reflection layers 13 and 14 are the same as described above.

The second near-infrared absorption layer 16 is a layer which is distinct from the aforementioned first near-infrared absorption layer 12 as shown in FIG. 3.

In an embodiment, at least one of the first near-infrared absorption layer 12 and the second near-infrared absorption layer 16 may include the aforementioned organic dye. In an embodiment, at least second near-infrared absorption layer 16 may include the aforementioned organic dye.

Accordingly, the optical structure 10 may absorb a near-infrared light in a broad near-infrared wavelength region using the first near-infrared absorption layer 12 including the inorganic materials (copper complex and metal oxide particles) and may complement near-infrared absorptivity in all by separately including the second near-infrared absorption layer 16 including the organic material (organic dye) having absorptivity in a desired (and/or alternatively predetermined) near-infrared wavelength region, in addition to the first near-infrared absorption layer 12.

For example, the organic dye may have a maximum absorption wavelength in a wavelength region of about 600 nm to about 800 nm. Accordingly, the aforementioned near first infrared absorption layer 12 provides a broad near-infrared absorptivity in the wavelength region of about 700 nm to about 1500 nm, for example about 700 nm to about 1200 nm, as well as a second near-infrared absorption layer 16 including the organic dye may compensate for the absorptivity of the infrared to the near-infrared wavelength regions belonging to the wavelength region of about 600 nm to about 800 nm.

In another example variation, the first near-infrared absorption layer 12 and the second near-infrared absorption layer 16 may be opposed each other while the transparent substrate 11 is disposed therebetween as shown in FIG. 3. By separating the first near-infrared absorption layer 12 and the second near-infrared absorption layer 16 which are distinct from each other using the transparent substrate 11 so that they are not in contact with each other, a film shrinkage during formation of the optical structure 10 formation may be minimized. As a result, the optical structure 10 in which the occurrence of internal curl is minimized and/or prevented may be provided.

The organic dye included in the second near-infrared absorption layer 16 may include a polymethine compound, a phthalocyanine compound, a merocyanine compound, a naphthalocyanine compound, a triarylmethane compound, a dipyrromethene compound, an anthraquinone compound, a naphthoquinone compound, a diquinone compound, a rylene compound, a perylene compound, a squaraine compound, a squarylium compound, a pyrylium compound, a thiopyrylium compound, a diketopyrrolopyrrole compound, an immonium compound, a diimmonium compound, a dithiolene metal complex compound, a derivative thereof, or a combination thereof.

The second near-infrared absorption layer 16 may be formed as a monolayer or a multilayer of at least two layers. In the case of the multiple layer, it may include an interlayer interfacial adhesive and/or an overcoating layer that limits and/or prevents oxygen and moisture permeation.

On the other hand, an interlayer interfacial adhesive and/or an overcoating layer that limits and/or prevents oxygen and moisture permeation may be also included between the first near-infrared absorption layer 12 and the second near-infrared absorption layer 16.

The optical structure 10 according to an example variation includes the transparent substrate 11 and the first near-infrared absorption layer 12 like the above embodiments and additionally, the second near-infrared absorption layer 16 and thus may further improve blocking performance of light in a near-infrared region.

For example, the optical structure 10 including the first near-infrared absorption layer 12 and the second near-infrared absorption layer 16 may have an average light transmittance of, for example, greater than or equal to about 70%, greater than or equal to about 75%, greater than or equal to about 80%, or greater than or equal to about 85% in a wavelength region of about 500 nm to about 565 nm and for example may have an average light transmittance of, for example less than or equal to about 20%, less than or equal to about 19%, less than or equal to about 18%, less than or equal to about 17%, or less than or equal to about 16% in a wavelength region of about 700 nm to about 1100 nm.

For example, the optical structure 10 including the first near-infrared absorption layer 12 and the second near-infrared absorption layer 16 may exhibit a change of an average light transmittance of less than or equal to about 3%, for example, less than or equal to about 2.9%, less than or equal to about 2.8%, less than or equal to about 2.7%, less than or equal to about 2.6%, or less than or equal to about 2.5% in a wavelength region of about 700 nm to about 1200 nm.

As for the optical structure 10 according to an example variation, the blocking performance of light in a near-infrared region may not only be applied to a broader wavelength region, but also excellent near-infrared absorbance and visible light transmittance may be obtained in a harsh environment such as a high temperature/high humidity environment.

For example, the optical structure 10 including the first near-infrared absorption layer 12 after being placed at a temperature of 80° C. and relative humidity 85 RH % for 120 hours may exhibit a change of an average light transmittance of less than or equal to about 4%, less than or equal to about 3%, less than or equal to about 2%, less than or equal to about 1%, or less than or equal to about 0.9% in a wavelength region of about 430 nm to about 565 nm of the optical structure.

For example, the optical structure 10 including the first near-infrared absorption layer 12 after being placed at a temperature of 80° C. and relative humidity 85 RH % for 120 hours may exhibit a change of an average light transmittance of less than or equal to about 10%, or less than or equal to about 9% in a wavelength region of about 700 nm to about 1200 nm of the optical structure, a change of an average light transmittance of less than or equal to about 0.5%, or less than or equal to about 0.4% in a wavelength region of about 700 nm to about 740 nm, a change of an average light transmittance of less than or equal to about 3%, less than or equal to about 2.9%, or less than or equal to about 2.8% in a wavelength region of about 700 nm to about 850 nm wavelength region, and a change of an average light transmittance of less than or equal to about 8%, less than or equal to about 7%, or less than or equal to about 6% in a wavelength region of about 700 nm to about 950 nm.

Herein, the aforementioned temperature, humidity, and placing time conditions are a stringent environment of high temperature/high humidity, and the change of the average light transmittance is a difference in the average light transmittance of the optical structure 10 after the condition application, as compared with the average light transmittance of the optical structure 10 before the condition application.

The optical structure 10 according to the present embodiment includes the transparent substrate 11, the first near-infrared absorption layer 12, and the second near-infrared absorption layer 16, thereby effectively transmitting light in the visible region and effectively blocking light in the near-infrared region. It also has excellent reliability even in a high temperature/high humidity environment, and may control a curl that may occur in the film by controlling the disposition of the transparent substrate 11 and the first near-infrared absorption layer 12.

In addition, the optical structure 10 according to the present embodiment further includes the infrared reflection layers 13 and 14 to reflect light in the mid-infrared region and far-infrared region and effectively block the light, and thus may be effectively used as an optical filter preventing transmittance of light in all the infrared regions. Accordingly, the optical structure 10 may be applied to an electronic device and thus may reduce or prevent distortion of an optical signal in a visible region by light in the infrared region.

The aforementioned optical structure 10 may be applied to all uses for filtering light in an infrared or near-infrared wavelength region, and may be, for example applied to a camera module and an electronic device including the same. The electronic device may be a digital camera, a camcorder, a monitoring camera such as CCTV, an in-car camera, a medical camera, a cell phone having a built-in or external camera, a computer having a built-in or external camera, a laptop computer having a built-in or external camera, and the like but is not limited thereto.

Figure 4:
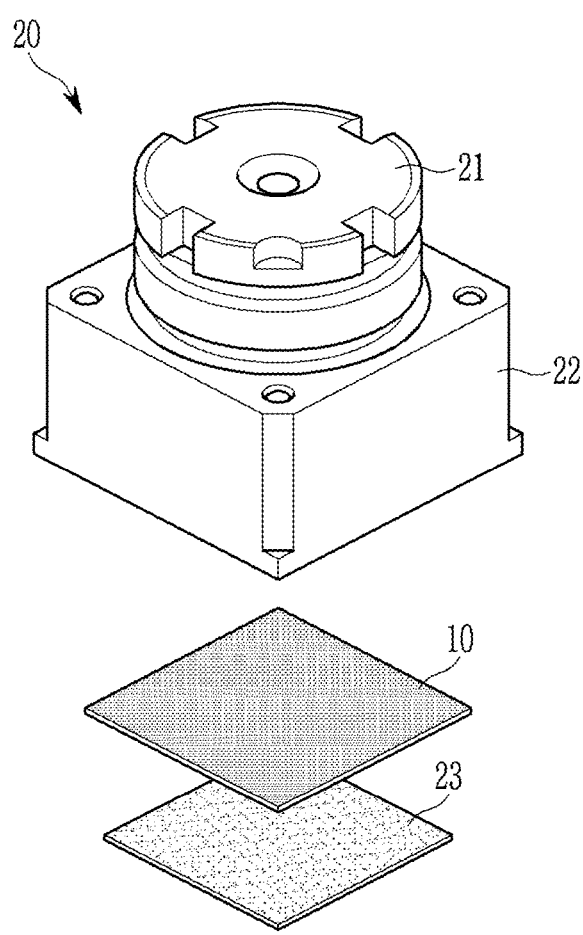
FIG. 4 is a schematic view showing a camera module according to an embodiment.

FIG. 4 is a schematic view showing a camera module according to an embodiment.

Referring to FIG. 4, a camera module 20 includes a lens barrel 21, a housing 22, an optical structure 10, and an image sensor 23.

The lens barrel 21 includes at least one lens imaging a subject, and the lens may be disposed along an optical axis direction. Herein, the optical axis direction may be a vertical direction of the lens barrel 21.

The lens barrel 21 is internally housed in the housing 22 and united with the housing 22. The lens barrel 21 may be moved in optical axis direction inside the housing 22 for autofocusing.

The housing 22 supports and houses the lens barrel 21 and may be open in the optical axis direction. Accordingly, incident light from one surface of the housing 22 may reach the image sensor 23 through the lens barrel 21 and the optical structure 10.

The housing 22 may be equipped with an actuator for moving the lens barrel 21 in the optical axis direction. The actuator may include a voice coil motor (VCM) including a magnet and a coil. However, various methods such as a mechanical driving system or a piezoelectric driving system using a piezoelectric device other than the actuator may be adopted.

The optical structure 10 is the same as described above.

The image sensor 23 may concentrate an image of a subject and thus store it as data, and the stored data may be displayed as an image through a display media.

The image sensor 23 may be mounted in a substrate (not shown) and electrically connected to the substrate. The substrate may be, for example, a printed circuit board (PCB) or electrically connected to a printed circuit board, and the printed circuit may be, for example, a flexible printed circuit (FPCB).

The image sensor 23 concentrates light passing the lens barrel 21 and the optical structure 10 and generates a video signal and may be a complementary metal-oxide semiconductor (CMOS) image sensor and/or a charge coupled device (CCD) image sensor.

Figure 5:
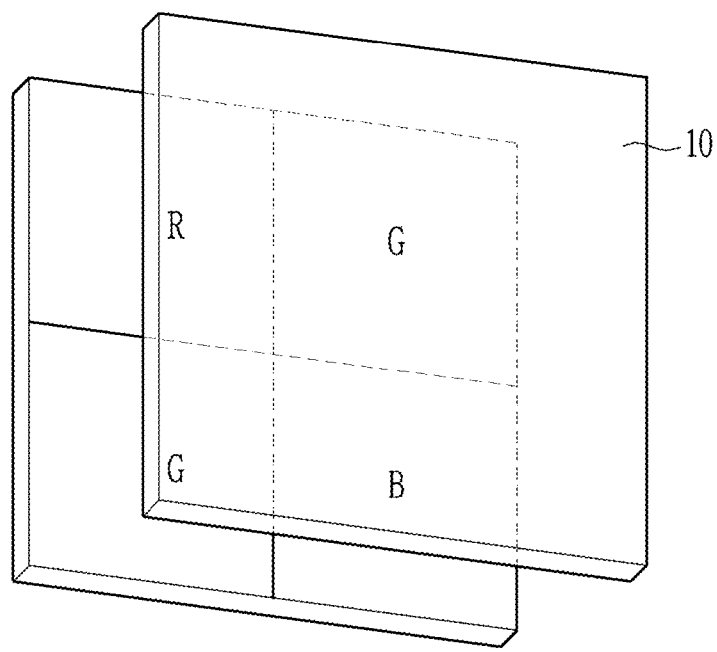
FIG. 5 is a top plan view showing an organic image sensor as one example of an image sensor.

FIG. 5 is a top plan view showing an organic image sensor as one example of an image sensor.

Referring to FIG. 5, the organic image sensor may be formed by arranging a red organic photoelectric device, a green organic photoelectric device, and a blue organic photoelectric device as Bayer shape in a monolayer on a near-infrared absorbing film, as shown in FIG. 5.

However, an embodiment is necessarily limited thereto, a detailed structures of organic image sensors may be variously set with a kind of materials and structures of the near-infrared absorbing film, and the like.

Figure 6:
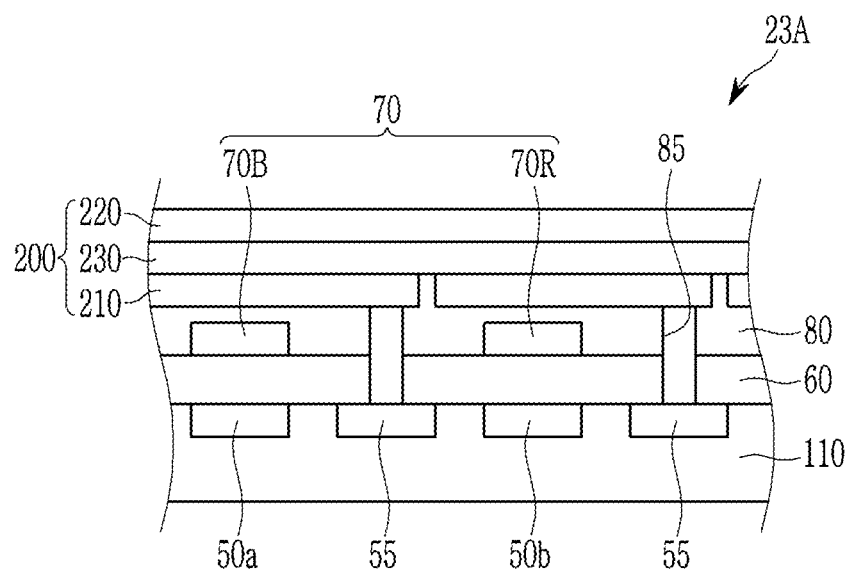
FIG. 6 is a cross-sectional view showing another example of the organic image sensor.

FIG. 6 is a cross-sectional view showing another example of the organic image sensor.

Referring to FIG. 5, an image sensor according to an embodiment is an organic CMOS image sensor 23A. The organic CMOS image sensor 23A according to an embodiment includes a semiconductor substrate 110 integrated with photo-sensing devices 50a and 50b, a transmission transistor (not shown), and a charge storage 55, a lower insulation layer 60, a color filter layer 70, a upper insulation layer 80, and an organic photoelectric device 200.

The semiconductor substrate 110 may be a silicon substrate, and is integrated with the photo-sensing devices 50a and 50b, the transmission transistor (not shown), and the charge storage 55. The photo-sensing devices 50a and 50b may be photodiodes.

The photo-sensing devices 50a and 50b sense light. The information sensed by the photo-sensing devices may be transferred by the transmission transistor, the charge storage 55 is electrically connected to the organic photoelectric device 100, and the information of the charge storage 55 may be transferred by the transmission transistor.

The photo-sensing devices 50a and 50b sense light, the information sensed by the photo-sensing devices may be transferred by the transmission transistor, the charge storage 55 is electrically connected to the organic photoelectric device 200, and the information of the charge storage 55 may be transferred by the transmission transistor.

A metal wire (not shown) and a pad (not shown) are formed on the semiconductor substrate 110. In order to decrease signal delay, the metal wire and pad may be made of a metal having low resistivity, for example, aluminum (Al), copper (Cu), silver (Ag), and alloys thereof, but is not limited thereto. However, it is not limited to the structure, and the metal wire and pad may be disposed under the photo-sensing devices 50a and 50b.

The lower insulation layer 60 is formed on the metal wire and the pad. The lower insulation layer 60 may be made of an inorganic insulating material such as a silicon oxide and/or a silicon nitride, or a low dielectric constant (low K) material such as SiC, SiCOH, SiCO, and SiOF. The lower insulation layer 60 has a trench exposing the charge storage 55. The trench may be filled with fillers.

A color filter layer 70 is formed on the lower insulation layer 60. The color filter layer 70 includes a blue filter 70a formed in the blue pixel and a red filter 70b formed in the red pixel. In the present embodiment, a green filter is not included, but a green filter may be further included.

The upper insulation layer 80 is formed on the color filter layer 70. The upper insulation layer 80 eliminates a step caused by the color filter layer 70 and smoothens the surface. The upper insulation layer 80 and lower insulation layer 60 may include a contact hole (not shown) exposing a pad, and a through-hole 85 exposing the charge storage 55 of a green pixel.

The organic photoelectric device 200 is formed on the upper insulation layer 80. The organic photoelectric device 200 includes a lower electrode 210 and an upper electrode 220 facing each other and an absorption layer 230 disposed between the lower electrode 210 and the upper electrode 220.

The lower electrode 210 and the upper electrode 220 may be all light-transmitting electrodes and the absorption layer 230 may selectively absorb light in a green wavelength region and may replace a color filter of a green pixel.

In this way, the semiconductor substrate 110 and the organic photoelectric device 200 selectively absorbing light in a green wavelength region have a stack structure and thereby the size of an image sensor may be reduced to realize a down-sized image sensor.

Focusing lens (not shown) may be further formed on the organic photoelectric device 200. The focusing lens may control a direction of incident light and gather the light in one region. The focusing lens may have a shape of, for example, a cylinder or a hemisphere, but is not limited thereto.

In FIGS. 1, 5, and 6, a structure where the organic photoelectric device selectively absorbing light in a green wavelength region is stacked on the semiconductor substrate 110 is illustrated, but the present disclosure is not limited thereto. An organic photoelectric device selectively absorbing light in a blue wavelength region may be stacked on the semiconductor substrate 110 and a green photo-sensing device and a red photo-sensing device may be integrated in the semiconductor substrate 110 or an organic photoelectric device selectively absorbing light in a red wavelength region may be stacked on the semiconductor substrate 110 and a green photo-sensing device and a blue photo-sensing device may be integrated in the semiconductor substrate 110.

Among the light in a visible region passing the lens barrel 21 (see FIG. 4) and the optical structure 10, light in a green wavelength region may be mainly absorbed in the absorption layer 230 and photoelectrically converted, and light in a blue wavelength region and a red wavelength region may pass the lower electrode 210 and be sensed by the photo-sensing devices 50*a* and 50*b*.

As described above, the optical structure 10 has improved near-infrared absorbance and low visible absorbance in various environments such as a high temperature/high humidity environment and the like and thereby may transfer light in a pure visible region to an image sensor and resultantly, reduce or prevent a crosstalk generated when a signal by light in a visible region is crossed and mixed with a signal by light in a non-visible region. Accordingly, an optical distortion phenomenon of the image sensor for example due to a used environment such as a high humidity environment and the like may be reduced and/or minimized, and a clear image may be obtained.

Hereinafter, the embodiments are illustrated in more detail with reference to examples. However, these examples are example, and the present scope is not limited thereto.

Preparation of Near-Infrared Absorbing Compositions

Preparation Example 5.6 g of 2-hydroxyethyl acryloyl phosphate (Sigma-Aldrich Corp.) and 5.2 g of copper(II) acetate [copper(II) acetate, Sigma-Aldrich Corp.] are dissolved in 30 g of acetone and then, reacted at room temperature for 5 hours, while stirred. Subsequently, the obtained reaction product is dripped into an excessive amount of a hexane solution to produce a precipitate, and the obtained precipitate is filtered and dried to obtain a copper complex represented by Chemical Formula 3-1.

[Chemcial Formula 3-1]

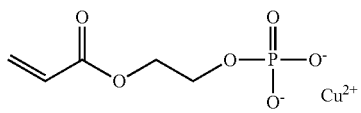

Separately, $C_{0.33}W_1O_3$ particles having an average particle diameter of 80 nm as metal oxide particles (YMF-02, SUMITOMO Metal Mining Co., Ltd.) are prepared.

Separately, an amine-based compound represented by Chemical Formula 1-2 (Sigma-Aldrich Corp.) and a 3-functional polymerizable compound represented by Chemical Formula 2-1 (Sigma-Aldrich Corp.) are respectively prepared.

[Chemical Formula 1-2]

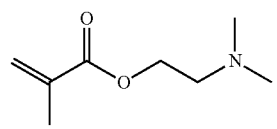

[Chemical Formula 2-1]

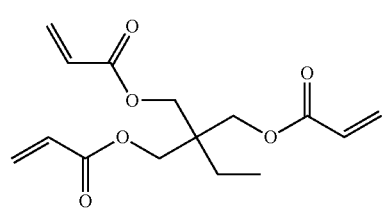

Subsequently, 1 g of the copper complex and 13 mg of the metal oxide particles are put in 1 g of tetrahydrofuran (THF), 0.15 g of the amine-based compound, 0.25 g of the polymerizable compound, and a photoinitiator (Irgacure-184, Ciba-Geigy Corp.) in an amount of 1 wt % of the total solid amount are respectively added thereto to prepare a near-infrared absorbing composition according to Preparation Example.

Comparative Preparation Example 1

A near-infrared absorbing composition according to Comparative Preparation Example 1 is prepared according to the same method as Preparation Example except that the amine-based compound is not used.

Comparative Preparation Example 2

A near-infrared absorbing composition according to Comparative Preparation Example 2 is prepared according to the same method as Preparation Example except that the polymerizable compound is not used.

Manufacture of Optical Structure

Example 1

The near-infrared absorbing composition according to Preparation Example is bar-coated on an about 80 μm-thick cycloolefin polymer substrate film on which an about 2 μm-thick interface adhesive layer (CH-02, Samhwa Paints Industrial Co., Ltd.) is formed and specifically, right on the interface adhesive layer and then, dried at about 70° C. for 5 to 10 minutes to volatilize the solvent. Subsequently, the coated composition is photocured with a UV light dose of about 500 mJ to manufacture an optical structure according to Example 1. The cured first near-infrared absorption layer has a thickness of about 100 μm.

Comparative Example 1

An optical structure according to Comparative Example 1 is manufactured according to the same method as Example 1 except that the near-infrared absorbing composition according to Comparative Preparation Example 1 is used instead of the near-infrared absorbing composition according to Preparation Example.

Comparative Example 2

An optical structure according to Comparative Example 2 is prepared according to the same method as Example 1 except that the near-infrared absorbing composition according to Comparative Preparation Example 2 is used instead of the near-infrared absorbing composition according to Preparation Example. However, as for Comparative Example 2, the near-infrared absorbing composition is not cured when photo-cured under the above condition, and a first near-infrared absorption layer itself is not formed.

Evaluation 1: Evaluation of Optical Characteristics According to Presence or Absence of Polymerizable Compound Each optical structure of Example 1 and Comparative Example 2 is measured with respect to a haze in a wavelength region ranging from 430 nm to 565 nm by using a spectrum colorimeter (CM-2600d, Konica Minolta Sensing, Inc.) in a SCI transmission mode.

On the other hand, each optical structure of Example 1 and Comparative Example 2 is measured with respect to average light transmittances in each wavelength region by using a UV-Vis spectrophotometer (SoldiSpec-3700, Shimadzu Scientific Instruments).

The haze measurement results and the average light transmittances measurement results of Examples 1 and 2 in each wavelength region are shown in Table 1. In Table 1, immeasurable data due to no formation of an absorption layer are marked as "ND".

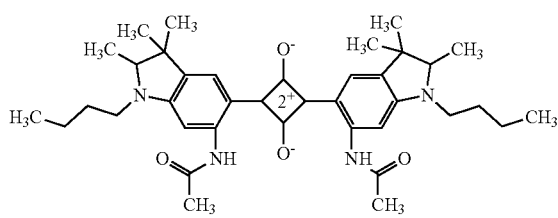

[Chemical Formula 4]

Subsequently, the organic near-infrared absorbing composition is bar-coated to be about 20 μm-thick on the other side of the cycloolefin polymer substrate film on which the first near-infrared absorption layer is not formed and then, dried at about 70° C. for 5 to 10 minutes to manufacture an optical structure according to Example 2.

In the optical structure according to Example 2, the first near-infrared absorption layer including an inorganic material and the second near-infrared absorption layer including an organic material face each other while the cycloolefin polymer substrate film is disposed therebetween.

TABLE 1

| | Average light transmittance [%] | | | | | | |
|---|---|---|---|---|---|---|---|
| | 430 nm-565 nm | 700 nm-740 nm | 740 nm-850 nm | 850 nm-950 nm | 950 nm-1100 nm | 1100 nm-1200 nm | Haze [%] |
| Example 1 | 83.78 | 2.11 | 15.48 | 18.44 | 28.06 | 41.64 | 1.2 |
| Comparative Example 2 | ND (absorption layer is not formed) | ND (absorption layer is not formed) | ND (absorption layer is not formed) | ND (absorption layer is not formed) | ND (absorption layer is not formed) | ND (absorption layer is not formed) | ND (absorption layer is not formed) |

Referring to Table 1, Example 1 shows an average light transmittance of less than or equal to 30% in a near-infrared wavelength region ranging from 700 nm to 1200 nm and particularly, in a wavelength region of 700 nm to 1100 nm as well as an excellent average light transmittance of greater than or equal to 80% in a visible wavelength region ranging from 430 nm to 565 nm. In addition, Example 1 shows a very excellent haze of less than or equal to 1.2% in a wavelength region of 430 nm to 565 nm and thus excellent optical reliability as an optical structure.

On the contrary, Comparative Example 2 including no polymerizable compound does not form a first near-infrared absorption layer itself and accordingly, may not be applied to an optical structure.

Accordingly, referring to the results of Table 1, a first near-infrared absorption layer in which a copper complex and metal oxide particles are mixed through an amine-based compound and a polymerizable compound may be stably formed, and the formed first near-infrared absorption layer shows excellent light transmittance and optical reliability.

Example 2

In Example 1, the first near-infrared absorption layer is cured, and then, an about 10 μm to 20 μm-thick cycloolefin polymer protective film is united thereon.

On the other hand, 0.03 g of a squarylium-based dye represented by Chemical Formula 4 and 1 g of a cycloolefin-based binder (TOPAS®) are added to and mixed with 10 mL of a chloroform solvent to prepare an organic near-infrared absorbing composition.

Comparative Example 3

An optical structure according to Comparative Example 3 is manufactured by controlling all the other details equally to Example 2 except that the aforementioned organic near-infrared absorbing composition is coated and cured to be about 20 μm thick on an about 80 μm-thick cycloolefin polymer substrate film, then the near-infrared absorbing composition of Preparation Example is coated thereon and cured, and an about 10 μm to 20 μm-thick cycloolefin polymer protective film is united thereon.

The optical structure according to Comparative Example 3 has a structure of sequentially stacking the cycloolefin polymer substrate film, the second near-infrared absorption layer, the first near-infrared absorption layer, and the cycloolefin polymer protective film from top to bottom.

Evaluation 2: Curl Control According to Positions of First and Second Near-Infrared Absorbing Layers The optical structures according to Example 2 and Comparative Example 3 are respectively cut into a size of a width of 50 mm×a length of 50 mm and allowed to stand in the air for one hour, and then, a length (a curl length) that 4 points of each cut film sample go up is measured from the bottom, and the results are shown in Table 2.

TABLE 2

|  | Curl length (mm) |
| --- | --- |
| Example 2 | 5 mm |
| Comparative Example 3 | 50 mm |

Referring to Table 2, in Comparative Example 3, as long a curl as a width or length of the cut sample is formed, but in Example 2, an about 10% shorter curl than that of Comparative Example is formed.

Accordingly, referring to the results of Table 2, a curl possibly formed in a film may be easily controlled by adjusting disposition of the first and second near-infrared absorption layers.

Evaluation 3: Evaluation of Reliability in High Temperature/High Humidity Environment According to Positions of First and Second Near-Infrared Absorption Layers Subsequently, the optical structures of Example 2 and Comparative Example 3 are measured with respect to average light transmittances in each wavelength region by using a UV-Vis spectrophotometer (SoldiSpec-3700, Shimadzu Scientific Instruments). When the measurement is complete, the optical structures are put in an environmental stress chamber (ARS-0220, Espec Corp.) and allowed to stand at 80° C. under relative humidity of 85 RH % for 120 hours and then, measured with respect to average light transmittances in each wavelength region after applied to a high temperature/high humidity environment by using a UV-Vis spectrophotometer (SoldiSpec-3700, Shimadzu Scientific Instruments).

Subsequently, each average light transmittance difference of the optical structures in each wavelength region before and after applied to the high temperature/high humidity environment is calculated to obtain an average light transmittance change ($\Delta$) before and after applied to the high temperature/high humidity environment. The results are shown in Table 3.

TABLE 3

| | Changes of average light transmittances before/after high temperature/high humidity environments ($\Delta$) [%] | | | | | |
| --- | --- | --- | --- | --- | --- | --- |
| | 430 nm-565 nm | 700 nm-740 nm | 740 nm-850 nm | 850 nm-950 nm | 950 nm-1100 nm | 1100 nm-1200 nm |
| Example 2 | −0.82 | 0.31 | 2.73 | 5.07 | 8.04 | 8.57 |
| Comparative Example 3 | −4.51 | 0.48 | 3.08 | 10.08 | 16.35 | 18.84 |

Referring to Table 3, Example 2 having the first near-infrared absorption layer including an inorganic material and the second near-infrared absorption layer including an organic material facing each other and spaced apart while the substrate film is disposed therebetween shows much excellent visible wavelength region average light transmittance and low near-infrared wavelength region average light transmittance compared with Comparative Example 3 having the first near-infrared absorption layer and the second near-infrared absorption layer bonded by the interface adhesive layer.

Accordingly, the results show that the optical structures according to example embodiments show excellent near-infrared absorbance and reliability in a high temperature/high humidity environment, low visible absorbance, and a minimized curl formation even when formed to have a large thickness.

While this disclosure has been described in connection with what is presently considered to be practical example embodiments, it is to be understood that inventive concepts are not limited to the disclosed embodiments. On the contrary, inventive concepts intended to cover various modifications and equivalent arrangements included within the spirit and scope of the appended claims.

| <Description of Symbols> | |
| --- | --- |
| 10: optical structure | 11: transparent substrate |
| 12: first near-infrared absorption layer | 13, 14: infrared reflection layer |
| 16: second near-infrared absorption layer | 20: camera module |
| 21: lens barrel | 22: housing |
| 23: image sensor | 23A: organic CMOS image sensor |
| 50a, 50b: photo-sensing device | 70: color filter layer |
| 60, 80: insulation layer | 200: organic photoelectric device |
| 210: lower electrode | 220: upper electrode |
| 230: absorption layer | |

What is claimed is:

1. A near-infrared absorbing composition, comprising;
a copper complex;
a metal oxide particle;
a polymerizable compound having 2 to 4 functional polymerizable groups; and
an amine-based compound represented by Chemical Formula 1, $$N(R_1)(R_2)(R_3) \quad \text{[Chemical Formula 1]}$$

wherein, in Chemical Formula 1,
$R_1$, $R_2$, and $R_3$ are independently one of hydrogen, a C1 to C20 alkyl group, a C1 to C20 alkenyl group, a C1 to C20 alkynyl group, a C1 to C20 aryl group, a C1 to C20 heteroaryl group, or a functional group represented by Chemical Formula X,

[Chemical Formula X]

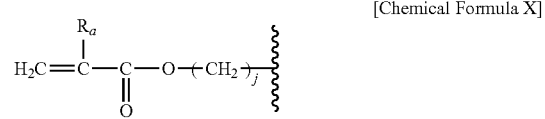

wherein, in Chemical Formula X,
$R_a$ is one of hydrogen, a C1 to C20 alkyl group, a C1 to C20 heteroalkyl group, a C1 to C20 aryl group, or a C1 to C20 heteroaryl group, and
j is an integer ranging from 0 to 8, and
wherein at least one of $R_1$ to $R_3$ is the functional group represented by Chemical Formula X.

2. The near-infrared absorbing composition of claim 1, wherein the amine-based compound is represented by Chemical Formula 1-1:

[Chemical Formula 1-1]

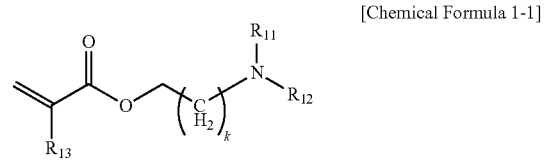

wherein, in Chemical Formula 1-1,
$R_{11}$, $R_{12}$, and $R_{13}$ are independently one of hydrogen, a C1 to C20 alkyl group, a C1 to C20 alkenyl group, a C1 to C20 alkynyl group, a C1 to C20 aryl group, or a C1 to C20 heteroaryl group, and
k is an integer ranging from 0 to 8.

3. The near-infrared absorbing composition of claim 1, wherein the polymerizable compound is represented by Chemical Formula 2:

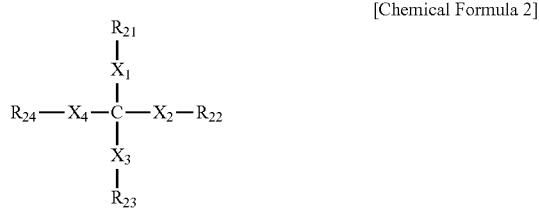

[Chemical Formula 2]

wherein, in Chemical Formula 2,
$X_1$, $X_2$, $X_3$, and $X_4$ are independently a single bond, or a C1 to C20 alkylene group,
$R_{21}$, $R_{22}$, $R_{23}$, and $R_{24}$ are independently one of hydrogen, a C1 to C20 alkyl group, a C1 to C20 alkenyl group, a C1 to C20 alkynyl group, a C1 to C20 aryl group, a C1 to C20 heteroaryl group, $-OR_{b1}$, $-C(=O)R_{b2}$, $-OC(=O)R_{b3}$, a C2 to C20 olefin group, a C3 to C30 (meth)acryl group, or a C2 to C20 epoxy group,
at least two of $R_{21}$, $R_{22}$, $R_{23}$, and $R_{24}$ are one of a C2 to C20 olefin group, a C3 to C30 (meth)acryl group, or a C2 to C20 epoxy group, and
$R_{b1}$, $R_{b2}$, and $R_{b3}$ are independently one of hydrogen, deuterium, a C1 to C20 alkyl group, a C1 to C20 alkenyl group, a C1 to C20 aryl group, or a C1 to C20 heteroaryl group.

4. The near-infrared absorbing composition of claim 1, wherein
the amine-based compound is about 1 wt % to about 20 wt % of a total weight of the near-infrared absorbing composition, and
the polymerizable compound is about 1 wt % to about 30 wt % of the total weight of the near-infrared absorbing composition.

5. The near-infrared absorbing composition of claim 1, wherein
the metal oxide particle includes at least one alkali metal, at least one alkaline-earth metal, or both at least one alkali metal and at least one alkaline-earth metal, and
the metal oxide particle includes at least one transition metal.

6. The near-infrared absorbing composition of claim 1, wherein the metal oxide particle has a maximum absorption wavelength in a wavelength region of about 1000 nm to about 1500 nm.

7. The near-infrared absorbing composition of claim 1, wherein the copper complex has a maximum absorption wavelength in a wavelength region of about 700 nm to about 950 nm.

8. The near-infrared absorbing composition of claim 1, further comprising:
a solvent, wherein
the solvent includes tetrahydrofuran, ethanol, butanol, acetone, methylethylketone, 1-methoxy-2-propanol, cyclopentanone, or a combination thereof.

9. An optical structure comprising:
a first near-infrared absorption layer formed using the near-infrared absorbing composition of claim 1, wherein
the first near-infrared absorption layer includes the metal oxide particle and a cross-linking polymerization product of the copper complex, the amine-based compound, and the polymerizable compound.

10. The optical structure of claim 9, wherein the first near-infrared absorption layer exhibits a haze of less than or equal to about 10% in a wavelength region of about 430 nm to about 565 nm.

11. The optical structure of claim 9, further comprising:
a transparent substrate configured to contact the first near-infrared absorption layer.

12. The optical structure of claim 11, further comprising:
an organic dye.

13. The optical structure of claim 12, further comprising:
a second near-infrared absorption layer that is distinct from the first near-infrared absorption layer, wherein
the organic dye is included in at least one of the first near-infrared absorption layer and the second near-infrared absorption layer.

14. The optical structure of claim 13, wherein
the first near-infrared absorption layer and the second near-infrared absorption layer are opposed to each other, and
the transparent substrate is between the first near-infrared absorption layer and the second near-infrared absorption layer.

15. The optical structure of claim 14, wherein the optical structure after being placed at a temperature of 80° C. and relative humidity 85 RH % for 120 hours exhibits a change of an average light transmittance of less than or equal to about 4% in a wavelength region of about 430 nm to about 565 nm.

16. The optical structure of claim 14, wherein the optical structure after being placed at a temperature of 80° C. and relative humidity 85 RH % for 120 hours exhibits a change of an average light transmittance of less than or equal to about 10% in a wavelength region of about 700 nm to about 1200 nm.

17. The optical structure of claim 14, further comprising:
an infrared reflection layer on at least one of a surface of the first near-infrared absorption layer and a surface of the second near-infrared absorption layer.

18. A camera module comprising
a lens;
an image sensor; and
the optical structure of claim 9 between the lens and the image sensor.

19. An electronic device comprising:
the optical structure of claim 9.

* * * * *